United States Patent
Hart

(10) Patent No.: US 9,660,947 B1
(45) Date of Patent: May 23, 2017

(54) METHOD AND APPARATUS FOR FILTERING UNDESIRABLE CONTENT BASED ON ANTI-TAGS

(75) Inventor: Matt Eric Hart, Lunenberg, MA (US)

(73) Assignee: INTUIT INC., Mountain View, CA (US)

( * ) Notice: Subject to any disclaimer, the term of this patent is extended or adjusted under 35 U.S.C. 154(b) by 305 days.

(21) Appl. No.: 13/560,912

(22) Filed: Jul. 27, 2012

(51) Int. Cl.
*G06F 15/16* (2006.01)
*H04L 12/58* (2006.01)

(52) U.S. Cl.
CPC .............. *H04L 51/12* (2013.01); *H04L 51/14* (2013.01); *H04L 12/58* (2013.01); *H04L 51/26* (2013.01)

(58) Field of Classification Search
CPC ... H04L 12/581; H04L 12/585; H04L 12/586; H04L 41/026; H04L 41/142; H04L 41/04; H04L 51/38; H04L 51/04; H04L 29/06578; H04L 63/0227; H04L 51/00; H04L 51/12; H04L 51/14; H04L 51/26; H04L 12/58; H04W 24/00
USPC ......... 709/201, 203, 205, 206; 726/1, 22, 27
See application file for complete search history.

(56) References Cited

U.S. PATENT DOCUMENTS

| | | | | |
|---|---|---|---|---|
| 5,978,566 A * | 11/1999 | Plank | ...................... | H04L 29/06 709/203 |
| 6,708,203 B1 * | 3/2004 | Makar | ................... | G06F 3/0489 707/999.006 |
| 7,386,520 B2 * | 6/2008 | Hehl | ..................... | G06Q 10/107 379/100.08 |
| 7,415,721 B2 * | 8/2008 | Fransdonk | .............. | G06F 21/10 380/281 |
| 7,941,851 B2 * | 5/2011 | Shahar | .................. | G06F 21/552 713/188 |
| 8,095,602 B1 * | 1/2012 | Orbach | ................ | G06Q 10/107 709/206 |
| 8,594,296 B2 * | 11/2013 | Stucker | ............. | H04M 3/42195 370/259 |
| 8,688,435 B2 * | 4/2014 | Nasri et al. | ....................... | 704/9 |
| 2001/0013037 A1 * | 8/2001 | Matsumoto | ....... | G06F 17/30867 |
| 2004/0034652 A1 * | 2/2004 | Hofmann et al. | ............ | 707/102 |
| 2004/0088357 A1 * | 5/2004 | Harding | .................. | H04L 51/12 709/206 |
| 2004/0088362 A1 * | 5/2004 | Curbow | .............. | G06Q 10/109 709/207 |
| 2004/0176072 A1 * | 9/2004 | Gellens | ................. | H04L 12/585 455/412.1 |

(Continued)

OTHER PUBLICATIONS

Havasi, C., Speer, R., Alonso, Jason B., ConceptNet 3: a Flexible, Multilingual Semantic Network for Common Sense Knowledge, pp. 1-7.

(Continued)

*Primary Examiner* — Thu Ha Nguyen
(74) *Attorney, Agent, or Firm* — Patterson + Sheridan, LLP

(57) ABSTRACT

One embodiment of the present invention provides a system that facilitates filtering undesirable content based on anti-tags. During operation, the system receives items of content. Next, the system receives an anti-tag, wherein an anti-tag describes content that a user has elected not to receive. The system then analyzes the items of content to identify one-or-more undesirable items of content that satisfy the anti-tag. Next, the system filters the one-or-more undesirable items of content from the items of content. Finally, the system presents the filtered items of content to the user.

27 Claims, 3 Drawing Sheets

(56) References Cited

U.S. PATENT DOCUMENTS

| | | | |
|---|---|---|---|
| 2004/0177110 A1* | 9/2004 | Rounthwaite | G06Q 10/107 709/202 |
| 2004/0216044 A1* | 10/2004 | Martin | G06F 8/10 715/273 |
| 2005/0138109 A1* | 6/2005 | Redlich et al. | 709/201 |
| 2005/0223085 A1* | 10/2005 | Giles | H04L 51/12 709/220 |
| 2005/0235034 A1* | 10/2005 | Chen et al. | 709/206 |
| 2006/0036689 A1* | 2/2006 | Buford | H04L 12/581 709/206 |
| 2006/0048059 A1* | 3/2006 | Etkin | 715/745 |
| 2007/0073837 A1* | 3/2007 | Johnson-McCormick et al. | 709/217 |
| 2007/0291757 A1* | 12/2007 | Dobson | H04W 24/00 370/392 |
| 2008/0021961 A1* | 1/2008 | Jhawar | H04L 12/585 709/206 |
| 2008/0109362 A1* | 5/2008 | Fransdonk | G06Q 30/06 705/51 |
| 2008/0141117 A1* | 6/2008 | King et al. | 715/238 |
| 2009/0265763 A1* | 10/2009 | Davies et al. | 726/3 |
| 2010/0036786 A1* | 2/2010 | Pujara | 706/46 |
| 2010/0037324 A1* | 2/2010 | Grant et al. | 726/27 |
| 2010/0057861 A1* | 3/2010 | Nigam | G06Q 10/107 709/206 |
| 2010/0095377 A1* | 4/2010 | Krywaniuk | 726/22 |
| 2010/0281178 A1* | 11/2010 | Sullivan | H04N 7/24 709/231 |
| 2011/0029468 A1* | 2/2011 | Fox | G06F 19/707 706/13 |
| 2011/0034342 A1* | 2/2011 | Fox | C40B 50/02 506/7 |
| 2011/0119730 A1* | 5/2011 | Eldar et al. | 726/1 |
| 2011/0209194 A1* | 8/2011 | Kennedy | 726/1 |
| 2011/0209195 A1* | 8/2011 | Kennedy | 726/1 |
| 2011/0289161 A1* | 11/2011 | Rankin et al. | 709/206 |
| 2012/0173512 A1* | 7/2012 | Burkey et al. | 707/713 |
| 2012/0227104 A1* | 9/2012 | Sinha et al. | 726/22 |
| 2012/0240228 A1* | 9/2012 | Alperovitch et al. | 726/22 |
| 2012/0317214 A1* | 12/2012 | Brunner | 709/206 |
| 2012/0323717 A1* | 12/2012 | Kirsch | G06Q 20/0855 705/26.1 |
| 2013/0210470 A1* | 8/2013 | Davies et al. | 455/466 |
| 2014/0052791 A1* | 2/2014 | Chakra et al. | 709/206 |
| 2014/0164506 A1* | 6/2014 | Tesch | G06Q 50/01 709/204 |
| 2014/0164507 A1* | 6/2014 | Tesch | H04L 51/10 709/204 |
| 2015/0301818 A1* | 10/2015 | Voronkov | G06F 8/65 717/168 |

OTHER PUBLICATIONS

Singh, P., "The Open Mind Common Sense Project," Jan. 1, 2002, http://www.kurzweilai.net/meme/frame.html?main=/articles/art0371.html, pp. 1-12.

* cited by examiner

METHOD AND APPARATUS FOR FILTERING UNDESIRABLE CONTENT BASED ON ANTI-TAGS

BACKGROUND

Field of the Invention

The present invention relates to electronic content. More specifically, the present invention relates to a method and an apparatus for facilitating filtering undesirable content based on anti-tags.

Related Art

Over the past decade, a major shift has taken place in the way that people receive information. The Internet has become the primary source for news, entertainment, financial information, commerce, etc. In addition, access to the Internet is being integrated into virtually every type of device from radios and televisions, to cars and trucks, to phones and tablets, and to household devices, such as toasters, light switches, and power meters, to name a few.

With an ever-growing number of content providers, coupled to an increasing number of devices providing content, it can be extremely difficult to access desired content from the content pool. Content aggregators, portals, and various social networking sites allow users to define desired content in terms of instructions for linking to existing accounts and services, subscribing to feeds, and specifying desired categories. Furthermore, these providers typically let users perform searches that eliminate content with a specific keyword, and allow users to block content from specific sources. However, these constraints may block a user from discovering content that she may actually want to see. For example, if a user performs a search, specifically excluding all content with the keyword "politics" because she does not want to be presented with political content, then the user may not be presented with an article relevant to her search that happens to include the word "politics" in a manner that is not relevant to the main point of the article. Furthermore, a user may block content of a source because 99% of the content is undesirable; however, that eliminates the ability of the user to discover the 1% that is desirable.

SUMMARY

One embodiment of the present invention provides a system that facilitates filtering undesirable content based on anti-tags. During operation, the system receives items of content. Next, the system receives an anti-tag, wherein an anti-tag describes content that a user has elected not to receive. The system then analyzes the items of content to identify one-or-more undesirable items of content that satisfy the anti-tag. Next, the system filters the one-or-more undesirable items of content from the items of content. Finally, the system presents the filtered items of content to the user.

In some embodiments of the present invention, analyzing the items of content to identify one-or-more undesirable items of content that satisfy the anti-tag involves analyzing meta-tags associated with items of content in the items of content.

In some embodiments of the present invention, analyzing the items of content to identify one-or-more undesirable items of content that satisfy the anti-tag involves analyzing a first n paragraphs of items of content in the items of content.

In some embodiments of the present invention, analyzing the items of content to identify one-or-more undesirable items of content that satisfy the anti-tag involves analyzing a source of items of content in the items of content.

In some embodiments of the present invention, analyzing the items of content to identify one-or-more undesirable items of content that satisfy the anti-tag involves analyzing items of content in the items of content using the Massachusetts Institute of Technology's Open Mind Common Sense (OMCS) computing platform.

In some embodiments of the present invention, using the OMCS computing platform involves: determining a meaning of items of content in the items of content, determining a likelihood of the meanings of items of content in the items of content matching the anti-tag, and filtering the items of content in the items of content if the likelihood meets a pre-determined threshold.

In some embodiments of the present invention, the steps of receiving, analyzing, filtering, and presenting are performed by a browser plug-in.

In some embodiments of the present invention, the steps of receiving, analyzing, filtering, and presenting are performed by an Operating System (OS) extension.

In some embodiments of the present invention, the steps of receiving, analyzing, filtering, and presenting are performed by an application.

In some embodiments of the present invention, the anti-tag is a simple string.

In some embodiments of the present invention, the anti-tag is a paragraph.

In some embodiments of the present invention, the anti-tag is saved in a user profile.

DETAILED DESCRIPTION

Figure 1:
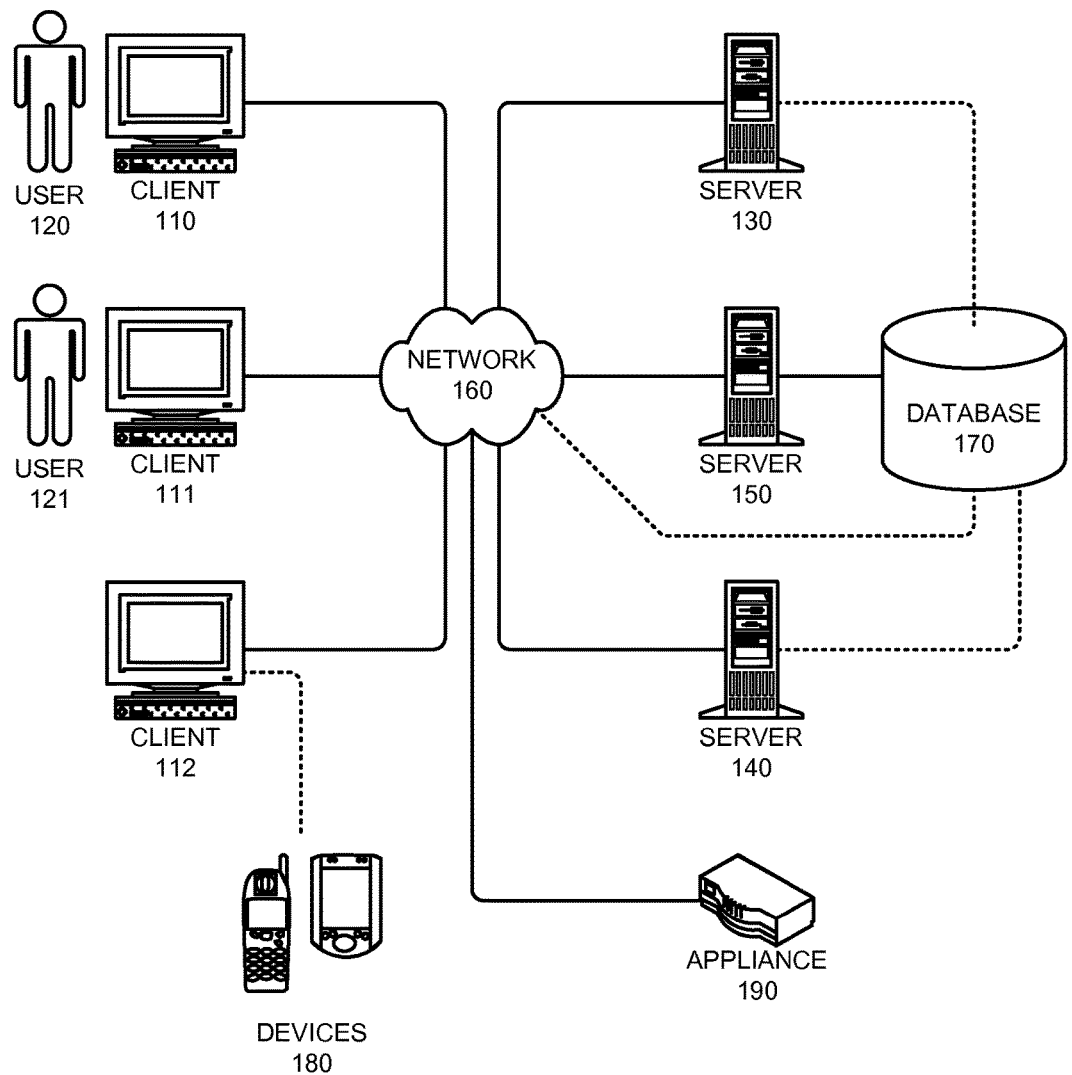
FIG. 1 illustrates a computing environment in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a non-transitory computer-readable storage medium, which may be any device or medium that can store code and/or data for use by a computer system. The non-transitory computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed. Note that the term "non-transitory computer-readable storage medium" comprises all computer-readable media, with the sole exception of a propagating electromagnetic signal.

The methods and processes described in the detailed description section can be embodied as code and/or data, which can be stored on a non-transitory computer-readable storage medium as described above. When a computer system reads and executes the code and/or data stored on the non-transitory computer-readable storage medium, the computer system performs the methods and processes embodied as data structures and code and stored within the non-transitory computer-readable storage medium.

Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Overview

One embodiment of the present invention provides a system that facilitates filtering undesirable content based on anti-tags. Rather than the user specifying content that they want to see, users specify content that they don't want to see. This allows the user to discover content that may have otherwise been missed. It is much easier for a user to define what she does not want to see than to define everything that she does want to see.

Note that a "tag" generally refers to metadata, usually text, describing an item of content. The term "anti-tag" is a tag that describes undesirable content from the vantage point of a particular user.

During operation, the system receives items of content. Next, the system receives an anti-tag, wherein an anti-tag describes content that a user has elected not to receive. The system then analyzes the items of content to identify one-or-more undesirable items of content that satisfy the anti-tag. Next, the system filters the one-or-more undesirable items of content from the items of content. Finally, the system presents the filtered items of content to the user.

Thus, a user defines a set of anti-tags that will be used to filter what the user receives. For example, rather than using a set of tags to define a photo feed from Flickr, the user may define things that she does not want to see, leaving open the opportunity to discover new things. A set of anti-tags for photos could include "celebrity, PowerPoint, screenshot," and the feed could be the Flickr public photo feed. The user in this example would then receive photos from Flickr that were not tagged or otherwise identified as "celebrity," "PowerPoint," or "screenshot."

In some embodiments of the present invention, analyzing the items of content to identify one-or-more undesirable items of content that satisfy the anti-tag involves analyzing meta-tags associated with items of content in the items of content. As described previously, the anti-tag can simply be one or more terms. If any of the terms of the anti-tag match a meta-tag, then the associated item of content would be filtered out.

In some embodiments of the present invention, analyzing the items of content to identify one-or-more undesirable items of content that satisfy the anti-tag involves analyzing a first n paragraphs of items of content in the items of content. In many cases, items of content do not include meta-tags describing the content. In these cases, the system may analyze the first n paragraphs of the content, such as the first three paragraphs, to determine the subject matter of the content.

In some embodiments of the present invention, analyzing the items of content to identify one-or-more undesirable items of content that satisfy the anti-tag involves analyzing a source of items of content in the items of content. For example, consider the situation where a user is visiting CNN to read up on current events. The user wants to read news, but does not want to read opinion pieces. In this example, the user may have defined an anti-tag to filter out opinion pieces. When the user searches the CNN family of sites, the system may automatically filter out any content coming from the CNN opinion and op-ed sites.

In some embodiments of the present invention, analyzing the items of content to identify one-or-more undesirable items of content that satisfy the anti-tag involves analyzing items of content in the items of content using the Massachusetts Institute of Technology's Open Mind Common Sense (OMCS) computing platform.

As described previously, anti-tags can be pointers to specific metadata matches, e.g. an online news article tagged "politics" would be filtered out by the anti-tag "politics." However, anti-tags can also be pointers to descriptions and statements that help a system determine if content matches an anti-tag, e.g. "politics: Politics are elections. Politics are candidates. Ron Paul is a candidate." Using the OMCS computing platform can be used to make anti-tag determinations based on content. For example, a user may not want to see any of her friend, Katja's Facebook posts regarding politics. Rather than exercising the option of "ignoring all posts from Katja"—since the user may be interested in reading about Katja's chicken-raising—the user can create an anti-tag for "politics." Before displaying a post, Facebook would now make sure that the specific post does not match one of the user's anti-tags. In this example, the system might test a number of conditions, including whether an included link in the post was tagged with the word "politics," or whether the content of the tags or the content of the article was "close" to the definition of "politics" by using the MIT OMCS computing platform. The user would then be free to peruse the articles that Katja posts relating to chicken-raising, but would not see any posts from Katja or anyone else that match the anti-tag "politics," including posts about Ron Paul and other candidates.

In some embodiments, the meanings of the anti-tags are determined by OMCS by analyzing entire paragraphs. Anti-tags are not limited to just words and phrases, but can also include complex ideas that are embodied in one-or-more sentences.

Note that the use of the OMCS computing platform with anti-tags may be particularly useful in cases where words have multiple meanings, or they have slang meanings other than their intended meaning. In these situations, anti-tags may be used to describe the "undesirable" content, and still allow the user to search for the term without the fear of receiving the "undesirable" content. For example, a user may define an anti-tag, "lingerie, intimate apparel, undergarments," indicating the content she does not want to see. The user can then perform a search for "thong," being reasonably assured that the results will relate to footwear, and not the undesirable content. This type of search is virtually impossible with standard keyword searching.

In some embodiments of the present invention, using the OMCS computing platform involves: determining a meaning of items of content in the items of content, determining a likelihood of the meanings of items of content in the items of content matching the anti-tag, and filtering the items of content in the items of content if the likelihood meets a pre-determined threshold.

In some embodiments of the present invention, the steps of receiving, analyzing, filtering, and presenting are performed by a browser plug-in. In this example, the system could be a plug-in to Mozilla, Safari, etc.

In some embodiments of the present invention, the steps of receiving, analyzing, filtering, and presenting are performed by an Operating System (OS) extension, while in other embodiments, the steps of receiving, analyzing, filtering, and presenting are performed by an application.

In some embodiments of the present invention, the anti-tag is saved in a user profile. This profile might exist within an application, such as Facebook. Alternatively, this profile might be part of a browser, or even part of the OS.

Computing Environment

FIG. 1 illustrates a computing environment 100 in accordance with an embodiment of the present invention. Computing environment 100 includes a number of computer systems, which can generally include any type of computer system based on a microprocessor, a mainframe computer, a digital signal processor, a portable computing device, a personal organizer, a device controller, or a computational engine within an appliance. More specifically, referring to FIG. 1, computing environment 100 includes clients 110-112, users 120 and 121, servers 130-150, network 160, database 170, devices 180, and appliance 190.

Clients 110-112 can include any node on a network including computational capability and including a mechanism for communicating across the network. Additionally, clients 110-112 may comprise a tier in an n-tier application architecture, wherein clients 110-112 perform as servers (servicing requests from lower tiers or users), and wherein clients 110-112 perform as clients (forwarding the requests to a higher tier).

Similarly, servers 130-150 can generally include any node on a network including a mechanism for servicing requests from a client for computational and/or data storage resources. Servers 130-150 can participate in an advanced computing cluster, or can act as stand-alone servers. In one embodiment of the present invention, server 140 is an online "hot spare" of server 150.

Users 120 and 121 can include: an individual; a group of individuals; an organization; a group of organizations; a computing system; a group of computing systems; or any other entity that can interact with computing environment 100.

Network 160 can include any type of wired or wireless communication channel capable of coupling together computing nodes. This includes, but is not limited to, a local area network, a wide area network, or a combination of networks. In one embodiment of the present invention, network 160 includes the Internet. In some embodiments of the present invention, network 160 includes phone and cellular phone networks.

Database 170 can include any type of system for storing data in non-volatile storage. This includes, but is not limited to, systems based upon magnetic, optical, or magneto-optical storage devices, as well as storage devices based on flash memory and/or battery-backed up memory. Note that database 170 can be coupled: to a server (such as server 150), to a client, or directly to a network.

Devices 180 can include any type of electronic device that can be coupled to a client, such as client 112. This includes, but is not limited to, cell phones, personal digital assistants (PDAs), smartphones, personal music players (such as MP3 players), gaming systems, digital cameras, video cameras, portable storage media, or any other device that can be coupled to the client. Note that, in some embodiments of the present invention, devices 180 can be coupled directly to network 160 and can function in the same manner as clients 110-112.

Appliance 190 can include any type of appliance that can be coupled to network 160. This includes, but is not limited to, routers, switches, load balancers, network accelerators, and specialty processors. Appliance 190 may act as a gateway, a proxy, or a translator between server 140 and network 160.

Note that different embodiments of the present invention may use different system configurations, and are not limited to the system configuration illustrated in computing environment 100. In general, any device that is capable of communicating via network 160 may incorporate elements of the present invention.

System

Figure 2:
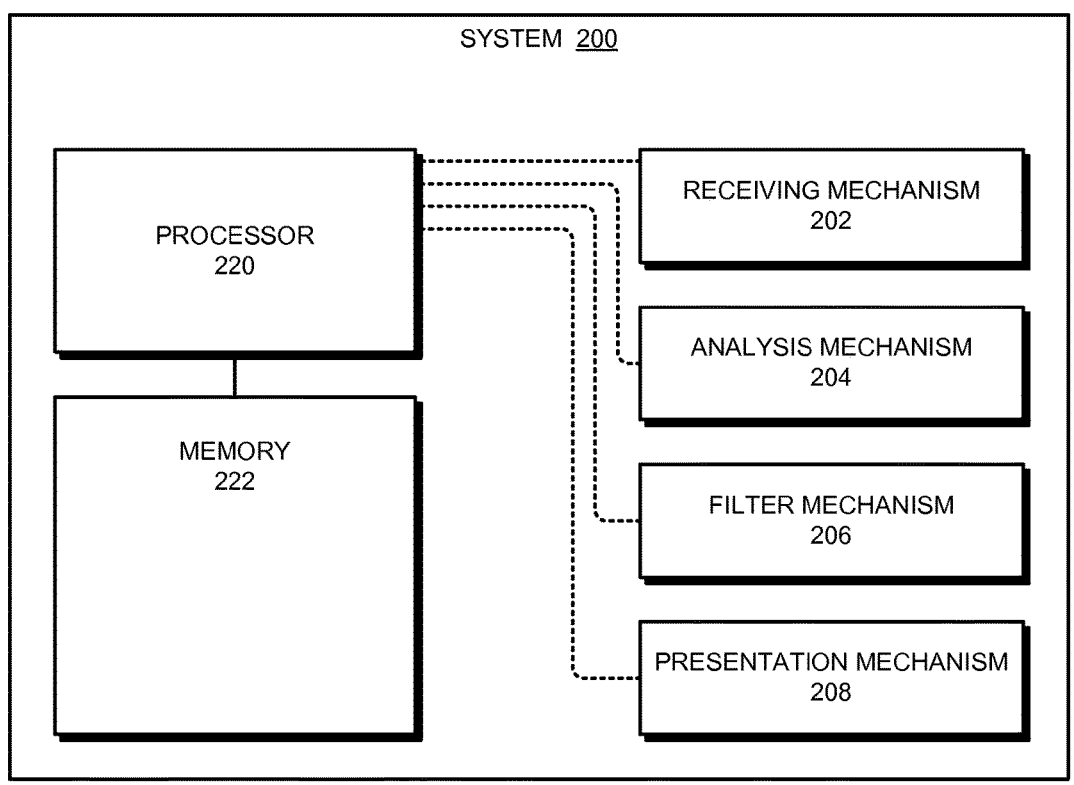
FIG. 2 illustrates a system in accordance with an embodiment of the present invention.

FIG. 2 illustrates a system 200 in accordance with an embodiment of the present invention. As illustrated in FIG. 2, system 200 can comprise server 150, database 170, appliance 190, client 110, devices 180, or any combination thereof. System 200 can also include receiving mechanism 202, analysis mechanism 204, filter mechanism 206, presentation mechanism 208, processor 220, and memory 222.

Filtering Content Based on Anti-Tags

Figure 3:
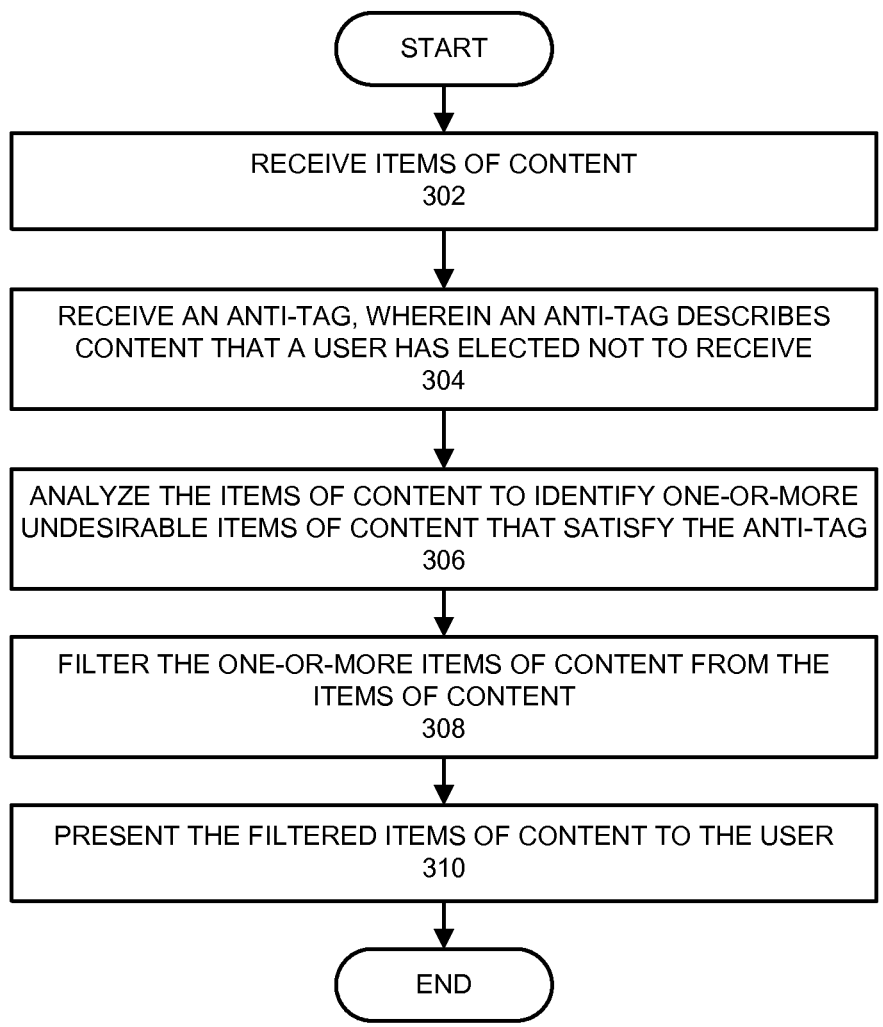
FIG. 3 presents a flow chart illustrating the process of filtering content based on anti-tags in accordance with an embodiment of the present invention.

FIG. 3 presents a flow chart illustrating the process of filtering content based on anti-tags in accordance with an embodiment of the present invention. During operation, receiving mechanism 202 receives items of content (operation 302). Next, receiving mechanism 202 receives an anti-tag, wherein an anti-tag describes content that user 120 has elected not to receive (operation 304). Analysis mechanism 204 then analyzes the items of content to identify one-or-more undesirable items of content that satisfy the anti-tag (operation 306). Next, filter mechanism 206 filters the one-or-more undesirable items of content from the items of content (operation 308). Finally, presentation mechanism 208 presents the filtered items of content to user 120 (operation 310).

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method for filtering undesirable content based on anti-tags, the method comprising:
   receiving, by computer, a plurality of items of content;
   receiving, by computer, an anti-tag, wherein an anti-tag describes content that a user has elected not to receive;
   analyzing, by computer, the plurality of items of content to identify one-or-more undesirable items of content that satisfy the anti-tag, wherein the analyzing includes:
      identifying at least a first one of the items of content that uses a word according to a first meaning described by the anti-tag for the word, and
      identifying at least a second one of the items of content that uses the word according to a second meaning not described by the anti-tag for the word;

filtering, by computer, the one-or-more undesirable items of content, including the first one of the items of content, from the plurality of items of content; and presenting, by computer, the filtered plurality of items of content, including the second one of the items of content, to the user.

2. The computer-implemented method of claim 1, wherein analyzing the plurality of items of content to identify one-or-more undesirable items of content that satisfy the anti-tag involves analyzing meta-tags associated with items of content in the plurality of items of content.

3. The computer-implemented method of claim 1, wherein analyzing the plurality of items of content to identify one-or-more undesirable items of content that satisfy the anti-tag involves analyzing a first n paragraphs of items of content in the plurality of items of content.

4. The computer-implemented method of claim 1, wherein analyzing the plurality of items of content to identify one-or-more undesirable items of content that satisfy the anti-tag involves analyzing a source of items of content in the plurality of items of content.

5. The computer-implemented method of claim 1, wherein analyzing the plurality of items of content to identify one-or-more undesirable items of content that satisfy the anti-tag involves analyzing items of content in the plurality of items of content using Massachusetts Institute of Technology's Open Mind Common Sense (OMCS) computing platform.

6. The computer-implemented method of claim 5, wherein using the OMCS computing platform involves:
   determining a meaning of items of content in the plurality of items of content;
   determining a likelihood of the meanings of items of content in the plurality of items of content matching the anti-tag; and
   filtering the items of content in the plurality of items of content if the likelihood meets a pre-determined threshold.

7. The computer-implemented method of claim 1, wherein the steps of receiving, analyzing, filtering, and presenting are performed by a browser plug-in.

8. The computer-implemented method of claim 1, wherein the steps of receiving, analyzing, filtering, and presenting are performed by an Operating System (OS) extension.

9. The computer-implemented method of claim 1, wherein the steps of receiving, analyzing, filtering, and presenting are performed by an application.

10. The computer-implemented method of claim 1, wherein the anti-tag is a simple string.

11. The computer-implemented method of claim 1, wherein the anti-tag is a paragraph.

12. The computer-implemented method of claim 1, wherein the anti-tag is saved in a user profile.

13. The computer-implemented method of claim 1, wherein the anti-tag is a pointer to a description or statement that helps the computer identify that the one-or-more undesirable items of content satisfy the anti-tag.

14. The computer-implemented method of claim 1, wherein the anti-tag includes one or more sentences or phrases.

15. A non-transitory computer-readable storage medium storing instructions that when executed by a computer cause the computer to perform a method for filtering undesirable content based on anti-tags, the method comprising:
   receiving, by computer, a plurality of items of content;
   receiving, by computer, an anti-tag, wherein an anti-tag describes content that a user has elected not to receive;
   analyzing, by computer, the plurality of items of content to identify one-or-more undesirable items of content that satisfy the anti-tag, wherein the analyzing includes:
      identifying at least a first one of the items of content that uses a word according to a first meaning described by the anti-tag for the word, and
      identifying at least a second one of the items of content that uses the word according to a second meaning not described by the anti-tag for the word;
   filtering, by computer, the one-or-more undesirable items of content, including the first one of the items of content, from the plurality of items of content; and
   presenting, by computer, the filtered plurality of items of content, including the second one of the items of content, to the user.

16. The non-transitory computer-readable storage medium of claim 15, wherein analyzing the plurality of items of content to identify one-or-more undesirable items of content that satisfy the anti-tag involves analyzing meta-tags associated with items of content in the plurality of items of content.

17. The non-transitory computer-readable storage medium of claim 15, wherein analyzing the plurality of items of content to identify one-or-more undesirable items of content that satisfy the anti-tag involves analyzing a first n paragraphs of items of content in the plurality of items of content.

18. The non-transitory computer-readable storage medium of claim 15, wherein analyzing the plurality of items of content to identify one-or-more undesirable items of content that satisfy the anti-tag involves analyzing a source of items of content in the plurality of items of content.

19. The non-transitory computer-readable storage medium of claim 15, wherein analyzing the plurality of items of content to identify one-or-more undesirable items of content that satisfy the anti-tag involves analyzing items of content in the plurality of items of content using Massachusetts Institute of Technology's Open Mind Common Sense (OMCS) computing platform.

20. The non-transitory computer-readable storage medium of claim 19, wherein using the OMCS computing platform involves:
   determining a meaning of items of content in the plurality of items of content;
   determining a likelihood of the meanings of items of content in the plurality of items of content matching the anti-tag; and
   filtering the items of content in the plurality of items of content if the likelihood meets a pre-determined threshold.

21. The non-transitory computer-readable storage medium of claim 15, wherein the steps of receiving, analyzing, filtering, and presenting are performed by a browser plug-in.

22. The non-transitory computer-readable storage medium of claim 15, wherein the steps of receiving, analyzing, filtering, and presenting are performed by an Operating System (OS) extension.

23. The non-transitory computer-readable storage medium of claim 15, wherein the steps of receiving, analyzing, filtering, and presenting are performed by an application.

24. The non-transitory computer-readable storage medium of claim 15, wherein the anti-tag is a simple string.

25. The non-transitory computer-readable storage medium of claim 15, wherein the anti-tag is a paragraph.

26. The non-transitory computer-readable storage medium of claim 15, wherein the anti-tag is saved in a user profile.

27. An apparatus for filtering undesirable content based on anti-tags, comprising:
- a memory;
  - a processor;
  - a receiving mechanism configured to receive a plurality of items of content;
  - wherein the receiving mechanism is further configured to receive an anti-tag, wherein the anti-tag describes content that a user has elected not to receive;
  - an analysis mechanism configured to analyze the plurality of items of content to identify one-or-more undesirable items of content that satisfy the anti-tag, wherein the analyzing includes:
    - identifying at least a first one of the items of content that uses a word according to a first meaning described by the anti-tag for the word, and
    - identifying at least a second one of the items of content that uses the word according to a second meaning not described by the anti-tag for the word;
  - a filter mechanism configured to filter the one-or-more undesirable items of content, including the first one of the items of content, from the plurality of items of content; and
  - a presentation mechanism configured to present the filtered plurality of items of content, including the second one of the items of content, to the user.

* * * * *